Jan. 18, 1966  A. F. JOHNSON  3,230,072
PRODUCTION OF ALUMINUM BY ELECTROTHERMAL REDUCTION
Filed May 4, 1962  2 Sheets-Sheet 1

INVENTOR
ARTHUR F. JOHNSON
BY Pennie, Edmonds,
Morton, Barrows & Taylor
ATTORNEYS Jan. 18, 1966 A. F. JOHNSON 3,230,072
PRODUCTION OF ALUMINUM BY ELECTROTHERMAL REDUCTION
Filed May 4, 1962 2 Sheets-Sheet 2

INVENTOR
ARTHUR F. JOHNSON
ATTORNEYS

United States Patent Office 3,230,072
Patented Jan. 18, 1966

3,230,072
PRODUCTION OF ALUMINUM BY ELECTRO-
THERMAL REDUCTION
Arthur F. Johnson, 235 E. 42nd St., 27th Floor,
New York 17, N.Y.
Filed May 4, 1962, Ser. No. 192,486
6 Claims. (Cl. 75—10)

This invention relates to the electrothermal reduction of aluminum oxide with carbon or equivalent solid reducing agent, and has for its object the provision of an improved process for producing aluminum or aluminum alloys at high temperature reduction.

The Cowles Patent 324,658 of 1885 and the Blackmore Patent 675,190 of 1901 describe the electrothermal reduction of aluminum oxide to produce alloys of aluminum. Since then electric arc furnaces for the production of steel of very large capacity, up to 35,000 kw., have gone into use. Since these furnaces use alternating current the capital investment for plant and apparatus is much less than the capital investment for a plant of comparable aluminum tonnage for practicing the Hall process which requires expensive equipment to operate with direct current at low voltage. Also, the Hall process requires a large number of small cells or pots which are expensive to construct, operate and maintain. Notwithstanding these facts, there has been no practical utilization of the electrothermal reduction of aluminum oxide.

It is known that carbon monoxide and aluminum vapor produced in the electrothermal process by reduction of aluminum oxide with carbon above 1700° C. are released from the reacting materials and react to form undesirable products. The released aluminum vapor and carbon monoxide tend to rise above the reacting solids or fusion and I control this action to prevent their interaction, for example to produce aluminum carbide and oxycarbide. My invention also provides a means for condensing the aluminum vapor and separating liquid aluminum from the other reactants.

My invention is based also on the importance of utilizing the lower specific gravity of aluminum (2.25 to 2.4) compared with fused aluminum oxide (4) in the production and recovery of aluminum in high temperature reduction. In the high temperature electrothermal reduction process of my invention I advantageously utilize the specific gravities of these materials to float the aluminum on the aluminum oxide fusion. My invention, accordingly, comprises a process for the reduction of aluminum oxide with carbon from a fusion in an electric furnace to form aluminum vapor and carbon monoxide, the rapid cooling of the vapor to the liquid phase to prevent reaction of the aluminum vapor with the carbon monoxide, and the accumulation of the liquid aluminum in a layer floating over the more dense fusion undergoing reduction. My invention provides means for maintaining a zone of cooled carbon monoxide gas above the liquid aluminum to maintain reducing conditions over the aluminum, and means for feeding into the reduction zone of the electric furnace a granular or coherent mixture of aluminum oxide (alumina) preferably in fused state and carbon, for example coke, free of loose fines or powder.

These and other features of the invention will be better understood after considering the following description with reference to the accompanying drawings in which FIG. 1 is a sectional side elevation of apparatus of the invention suitable for carrying out a process of the invention;

Figure 1:
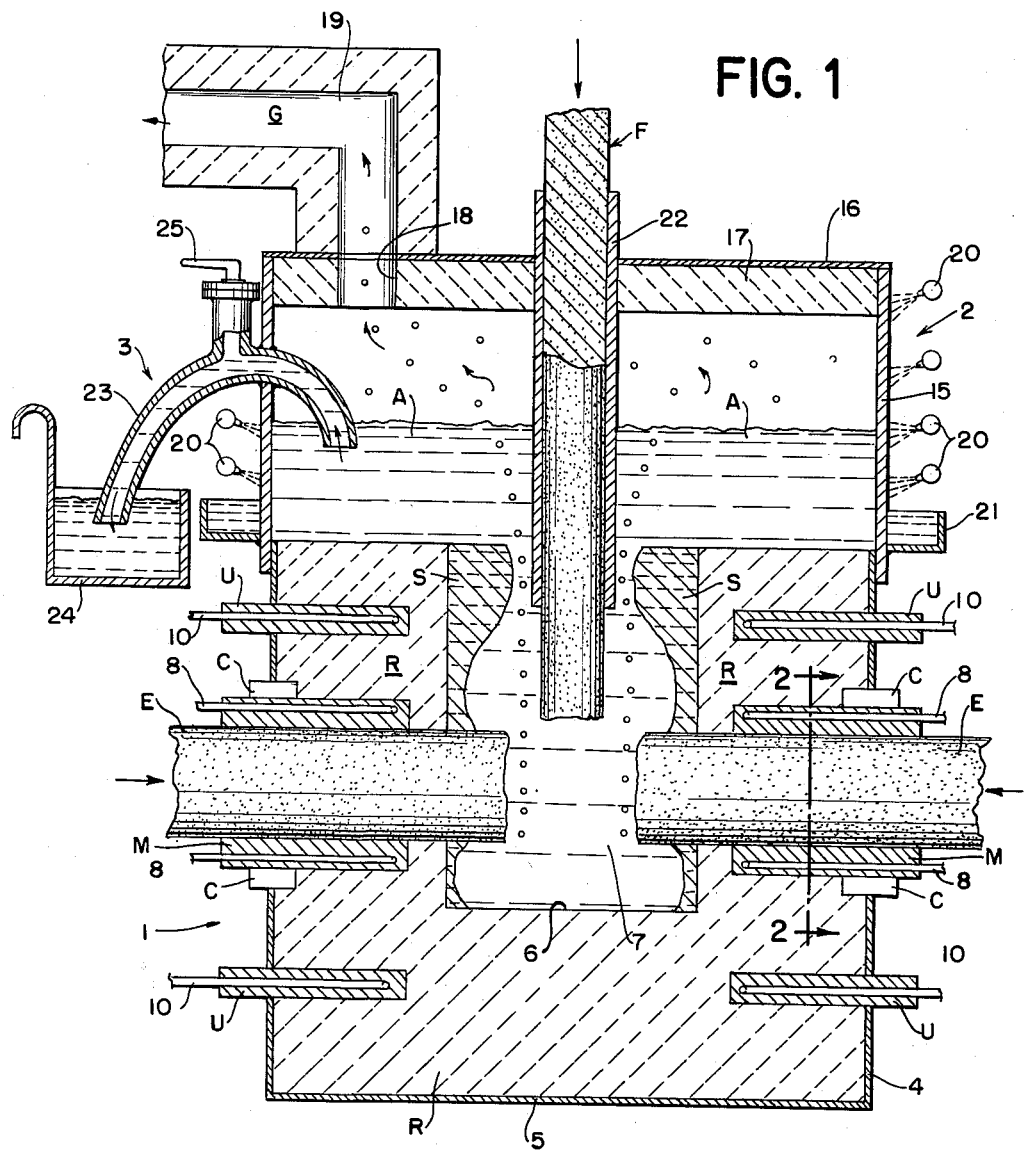
Figure 2:
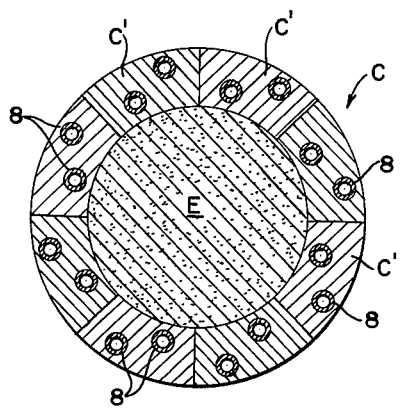
FIG. 2 is a sectional view at 2—2 of FIG. 1.

The apparatus illustrated in FIGS. 1 and 2 comprises a reduction furnace 1, a superimposed metal recovery part or chamber 2 and a metal removal part 3.

The reduction furnace part 1 comprises a cylindrical steel shell 4, a flat steel bottom 5 and a refractory lining R formed of fused alumina, high-alumina firebrick or other suitable refractory, arranged to form therein a reduction chamber 6 for confining a charge of aluminum oxide and solid carbon 7 for reduction. The steel side wall and refractory side wall have a plurality of openings through which carbon or graphite electrodes E are inserted and project into the charge 7. These electrodes may be disposed horizontally or inclined as much as 45° and are provided with means (not shown) to feed them into the charge as they are consumed. These electrodes are preferably arranged in groups of three for connection to a three-phase alternating current system. Any suitable multiple of three electrode units may be used. The openings through which the electrodes are inserted include cooling collars C in direct contact with the refractory and electrodes to cool not only the electrodes themselves but the refractory material in contact therewith. The electrodes are preferably cylindrical in shape and the cooling collars C fit the electrodes closely. Since such electrodes are frequently irregular, it is preferred to form the collars of a plurality of segmented elements C′ as best shown in FIG. 2. These collars may be formed of cast bronze and the like and are provided with interior ducts for the circulation therein of cooling water through the pipes 8. The bronze cooling members M are electrically insulated from the steel shell 4 by the asbestos collars C.

In view of the high temperature in the chamber 6 it is frequently necessary to provide cooling units U in the refractory lining defining the chamber preferably in the form of bronze plugs having means for the circulation of cooling water therein through pipes 10.

The metal recovery part 2 comprises a cylindrical metal shell 15, preferably formed of cast iron, and a horizontal flat steel top 16 which has an underlying layer of refractory 17. The refractory and top have an opening 18 and this opening leads into a refractory lined duct 19 for the removal of gas.

The metal recovery part 2 fits closely over the reduction furnace 1 so that the steel cylinder wall 15 is in close contact with the cylindrical wall 4. The outside of the cast iron cylinder 15 is preferably cooled with a number of water sprays 20 and the lower portion of the cylinder has an attached launder 21 for catching the cooling water and draining it away from the reduction furnace.

The top of metal recovery part 2 has a central opening through which is inserted a hollow tube or pipe 22, formed of graphite or fused alumina, through which a mixture of aluminum oxide and solid carbon is fed into the chamber 6. This tube extends well into the chamber 6 so that the charging material enters the chamber at a place where the material is sufficiently heated to be fused. The top of the tube may have a gas-tight feed valve and the tube is supported by means (not shown) to push the tube into the reduction furnace as the lower end is consumed or worn away.

The metal removing part 3 of the apparatus comprises a siphon pipe 23 formed of any suitable metal such as cast iron which passes through the cylinder 15, the inner portion of which dips into the liquid aluminum produced in the process and the other end is arranged to discharge the molten aluminum into a ladle 24. This siphon is similar to those used in removing aluminum from the Hall cells and has the usual means 25 for applying a vacuum to initiate the flow of metal through the siphon 23.

Figure 3:
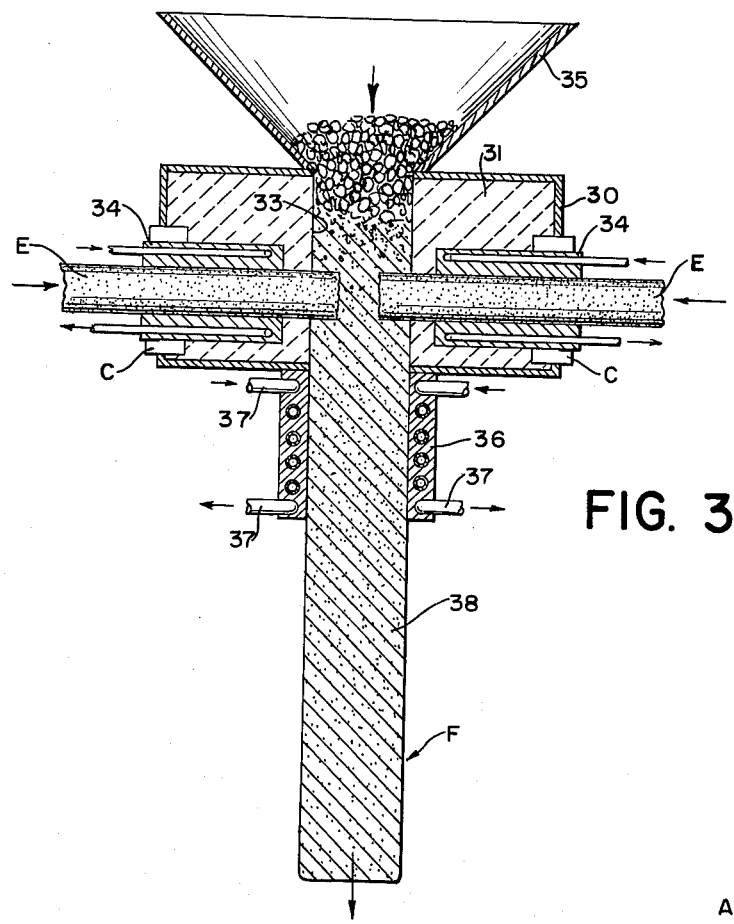
FIG. 3 is a sectional side elevation of other apparatus of the invention.

The apparatus illustrated in FIG. 3 comprises a steel shell 30 having a refractory lining 31 with a cylindrical chamber 33 therein. Carbon or graphite electrodes E are inserted through the refractory and into the chamber 33. These electrodes may be cooled by surrounding collars 34 similar to those described in connection with FIG. 1 and are electrically insulated from the steel shell by the asbestos collars C. Above the opening 33 is a feed hopper 35, preferably formed of steel, having an opening into the chamber 33. Beneath the chamber 33 is a cooling unit 36 in the form of a water cooled mold such as a cast bronze collar having means for circulating cooled water therein through pipes 37.

The apparatus of FIG. 3 is used to form a sintered mass of aluminum oxide and solid carbon or other reducing agent. An intimate mixture of aluminum oxide and solid carbon is charged into the hopper 35. In operation of this furnace a charge mixture consisting of one part by weight of alumina to three parts by weight of carbon are preferably used. One half the oxygen or a little more may be eliminated in the melting reaction and continuous casting process which thereby lessens the amount of carbon monoxide to be eliminated in the reduction furnace shown in FIG. 1. The furnace of FIG. 3 may be located directly above the furnace of FIG. 1 so that the fused solid rod shown as F which constitutes the alumina-carbon mixture is fed downward through the roof 16, through the aluminum layer and into the aluminous fusion so that the aluminous fusion in vessel 6 is almost entirely separated from the metal layer by the fused rod, excepting where gas is escaping along the sides which gas minimizes actual contact of the aluminous fusion with the much cooler aluminum metal.

An operation of the invention may be carried out in the apparatus of FIGS. 1 and 2 as follows:

A charge mixture such as granular (dust free) fused aluminum oxide (alumina) and solid carbon, or a more or less rod-like fusion as produced in the apparatus of FIG. 3 is fed into the reduction chamber 6 through the refractory duct 22 or through the roof. Instead of carbon as the reducing agent, I may use aluminum carbide as the reducing agent as a substitute for a part or all of the carbon. The operation is carried out by keeping the reduction chamber filled with charge. Alternating current is applied to the electrodes E in a manner similar to voltage control and current density as in the operation of the Heroult arc furnaces for melting steel. The charge is fused by heating to a temperature of from 1700–2400° C. Aluminum oxide by itself fuses at about 2040° C. but the various compounds produced in the thermoelectric reduction such as aluminum metal, aluminum carbides, aluminum oxycarbides and possibly the aluminum oxide $Al_2O$ all or in part effect a lowering of the melting point of the fusion. This fuses most of the charge but since the upper part of the charge in contact with the cooled refractory R is at a lower temperature, there is a solid frozen mass of charged alumina S surrounding the duct 22 leaving only a narrow annular liquid alumina charge in immediate contact with the duct 22.

As a result of the high temperature the aluminum is reduced and vaporized with the formation of carbon monoxide. The vapor and gas bubble up through the charge around the duct 22 or the fused rod as the case may be and enter the receiving chamber 2. Since the sides of recovery chamber 2 are cooled the aluminum liquefies and forms the layer A resting over the refractory R and over the frozen charge S. The carbon monoxide accumulates in the space above the aluminum layer A and flows out through hole 18 and duct 19. Duct 19 has a pressure relief valve (not shown) which permits the carbon monoxide to build up a pressure greater than atmospheric pressure to prevent the infiltration of air and resulting reaction with the liquid aluminum. The temperature in the receiving chamber 2 is controlled to maintain the aluminum layer A as a liquid which may be siphoned out through unit 3 as required. This layer of aluminum is cooled by radiation through the gas space above to the furnace roof refractory 16 and the water cooled cast iron sides 15. Thus by cooling it is possible to keep the molten aluminum pool at any temperature from its melting point of 660° C. to its boiling point at 1800° C. As a practical matter the choice of temperature for best operation lies between these extremes. At the higher extreme temperature aluminum tends to react very rapidly with gases such as nitrogen or oxygen from the atmosphere and it is important to exclude these gases as much as possible and to keep the temperature low. Also aluminum tends to form carbides and oxycarbide sludges at the higher temperatures so I prefer a working range between 800° C. and 1400° C. A temperature below 1000° C. is especially preferred because such comparatively low temperature serves to rapidly cool the gaseous aluminum evolved from the reduction furnace and condense it rapidly to the liquid phase in which its reactivity with solids and gases is much less than in the vapor phase. Likewise the comparatively low temperatures below 1000° C. rapidly chills the carbon monoxide gas and reduces its volume compared with the gas volume at the reaction temperatures of 1700° to 2100° C. This reduction in gas volume makes the gas evolution less violent. There is an enormous flow of heat from between the electrodes in E towards the interface to compensate for an equally enormous flow of heat in the molten aluminum A from the interface to the water-cooled, cast iron lined upper steel walls 15 of the furnace. This enormous heat loss represents electrical power consumption in the process and can only be justified by the fact that it makes the electrothermal process workable by condensing the aluminum vapor produced and chilling it so that the reduction reaction does not reverse itself and produce aluminum oxide and carbon.

It is necessary to provide double gas seal gates or locks at the top of duct 22 so that the flow of the alumina-carbon mixture downward is not opposed by the carbon monoxide gas escaping from fusion 7. From time to time duct 22 is removed leaving an opening in the roof through which it may be desirable to skim any small amounts of accumulated solids such as carbon floating on top of the liquid aluminum A and remove them from the furnace. The skimmings may be incorporated into the alumina-carbon mixture which is fed into the furnace through duct 22. However, I prefer a furnace door in the side walls of the furnace through which skimming is continuously done by suitable automated water cooled rotating rake arms (not shown) so that the skimmings are removed without labor and without gas leakage from the furnace. In the aluminum tapped from the layer A some small skimmings will be obtained, as in any Hall process plant or aluminum melting plant, and these skimmings may likewise be mixed with the alumina-carbon mixture so that I may contain a recirculating load of skimmings in addition to the stoichiometric quantities of carbon and aluminut oxide required by the equation:

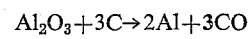

$$Al_2O_3 + 3C \rightarrow 2Al + 3CO$$

Likewise for purpose of keeping the aluminum metal A free of oxide and other substances that make it viscous I sometimes add small amounts of aluminum halides such as aluminum chloride to the aluminum and these halides are vaporized and caught in the skimmings or condensed in a condenser provided for the purpose in the vent duct G and the halides are returned into the alumina-carbon mixture thus constituting part of said recirculating feed load.

Of course aluminum alloying ingredients may be incorporated into the aluminum layer A to the extent that the molten aluminum is not made heavier than the aluminous fusion 7. Small alloy additions of metals with high boiling points greatly decrease the vapor pressure of the aluminum alloy and so prevent the escape of aluminum vapor but the means of cooling the aluminum which my invention provides makes such alloy additions unnecessary for effective condensation of aluminum vapor. I prefer to make commercially pure aluminum by my process by the addition of commercial specification alumina and calcined petroleum coke which contain only a few hundredths of a percent impurity of the oxides of iron, silicon and titanium. By this means the impurities in the aluminum produced by my process are limited to the impurities in the alumina and petroleum coke used together with the small amounts added in the electrodes consumed.

From this description of my process it is apparent that my invention provides an important means of condensing the vapor phase aluminum evolved in the electrothermal reduction of aluminum so that the reaction of aluminum vapor and carbon monoxide is instantly stopped. Likewise stopped are other possible reactions of aluminum vapor that occur at high temperatures which result in formation of aluminum carbide, aluminum oxycarbide and aluminum oxides other than $Al_2O_3$. The feature of my invention that shrinks the gas volume evolved is important because the evolved gas causes turbulence in the aluminous fusion and in the layer of condensed aluminum. To decrease such turbulence I prefer to use six, nine or twelve electrodes rather than three large ones since the bubbles of gas evolved are smaller with many small electrodes. An important feature of my invention is that horizontal electrodes as illustrated in FIG. 1 result in smaller bubbles of gas than vertical electrodes conventionally used in electric furnaces.

By feeding into the fusion 7 in vessel 6 through duct 22 a mixture of carbon and aluminum oxide which has previously been fused and reacted together to form some mixture of oxide and carbon with less oxygen present than represented by $Al_2O_3$ it is possible to further decrease the amount of carbon monoxide evolved.

I claim:

1. The process of producing aluminum by electrothermal reduction of aluminum oxide which comprises electrically heating a mixture of aluminum oxide and solid carbon to a temperature above the fusion temperature of the reacted aluminum oxide and carbon and reducing aluminum in vapor form and forming carbon monoxide, providing over the fusion and in contact therewith a liquid body of aluminum, passing the vapors of aluminum and carbon monoxide released in the reduction upward through the body of aluminum, providing above the body of aluminum a confined zone of carbon monoxide which protects the body of aluminum, cooling the aluminum vapor to the liquid state and the carbon monoxide to prevent interaction thereof, and removing liquid aluminum from the body and carbon monoxide from the zone.

2. In the process of claim 1 heating the fusion between graphite electrodes to a temperature above 1700° C. and passing released aluminum vapor and carbon monoxide upward through the fusion.

3. In the process of claim 1 accumulating the liquid aluminum in a layer of substantial area with only a relatively small fraction of the area in contact with the fusion.

4. In the process of claim 1 feeding a mixture of aluminum oxide and solid carbon in a fused and reacted state downwardly through a duct into the reduction zone.

5. In the process of claim 1 carrying out the reduction between graphite electrodes in which the aluminum oxide is fused, and in the reduction chamber above the electrodes freezing aluminum oxide on the refractory lining of the chamber to reduce the cross-sectional area of the chamber.

6. In the process of claim 1 maintaining carbon monoxide under sufficient pressure over the liquid aluminum to prevent the infiltration of air into contact with the aluminum.

References Cited by the Examiner

UNITED STATES PATENTS

| 491,394 | 2/1893 | Willson | 75—10 |
| 2,776,884 | 1/1957 | Grunert | 75—68 |
| 2,974,032 | 3/1961 | Grunert et al. | 75—10 |
| 3,031,294 | 4/1962 | Searcy et al. | 75—89 |
| 3,059,038 | 10/1962 | Grunert et al. | 13—9 |

DAVID L. RECK, *Primary Examiner.*

WINSTON A. DOUGLAS, *Examiner.*